Feb. 17, 1942. J. A. CHATER 2,273,020
FRUIT BRUSHING MACHINE
Filed Sept. 17, 1938 4 Sheets-Sheet 2
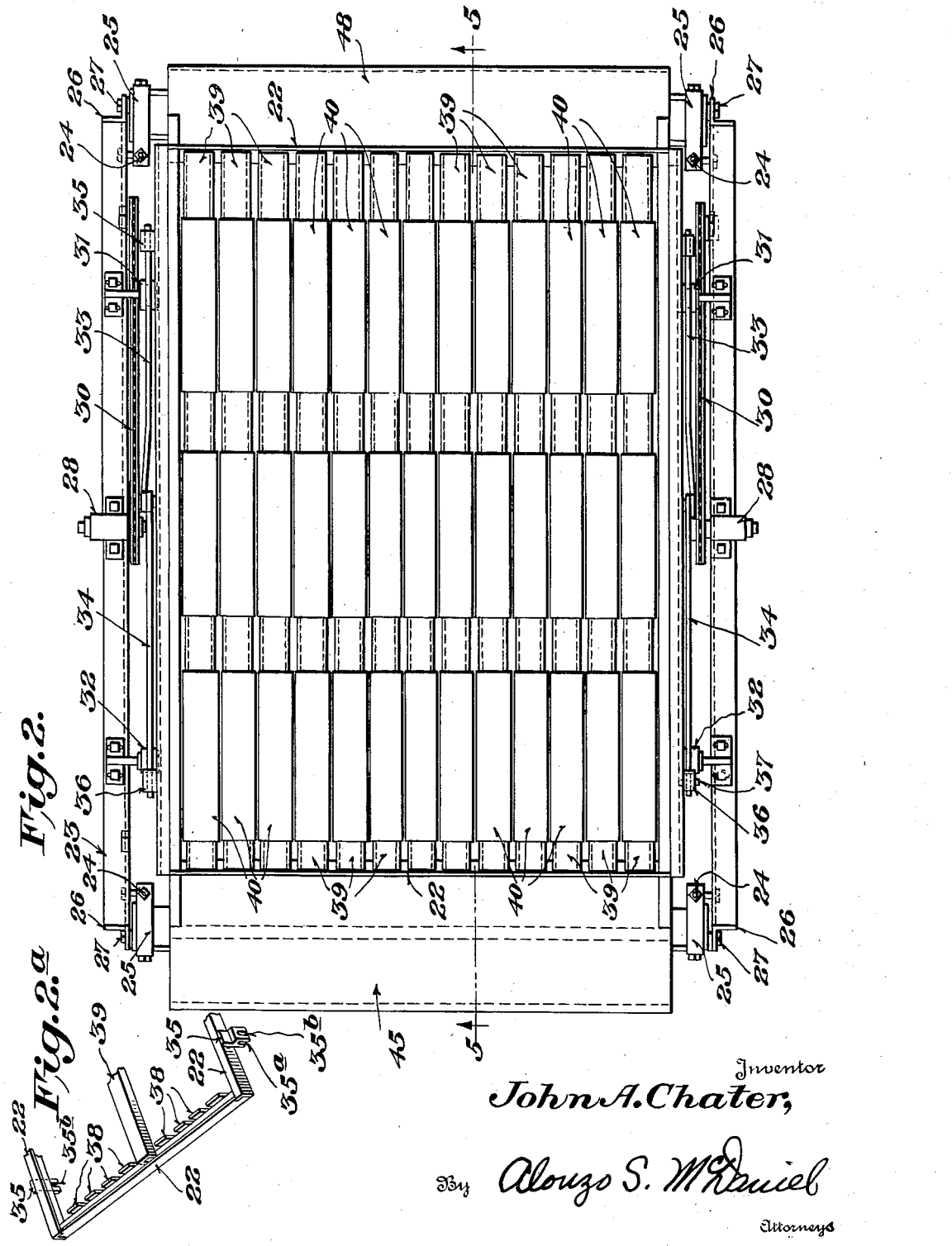
Inventor
John A. Chater,
By Alonzo S. McDaniel
Attorneys

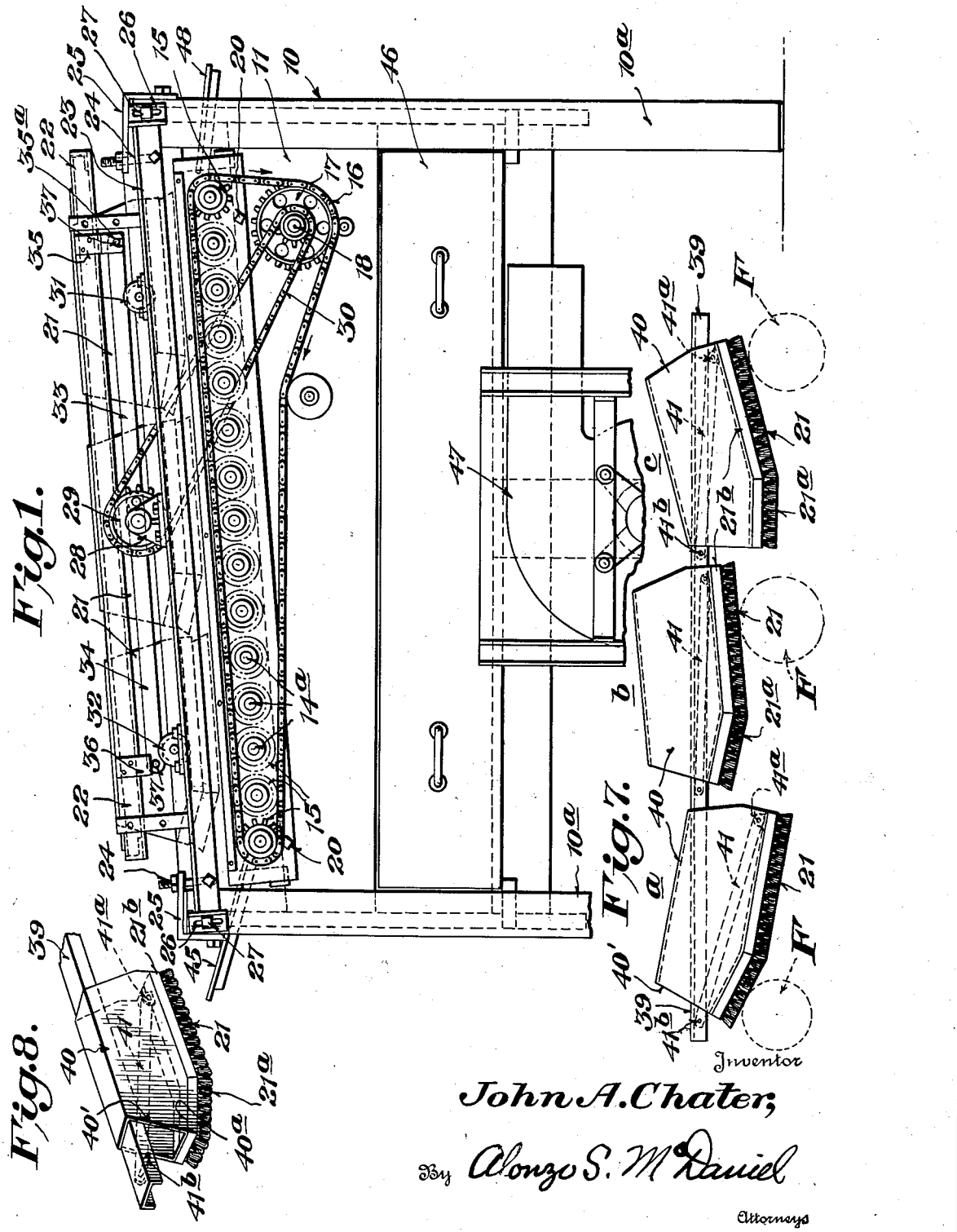

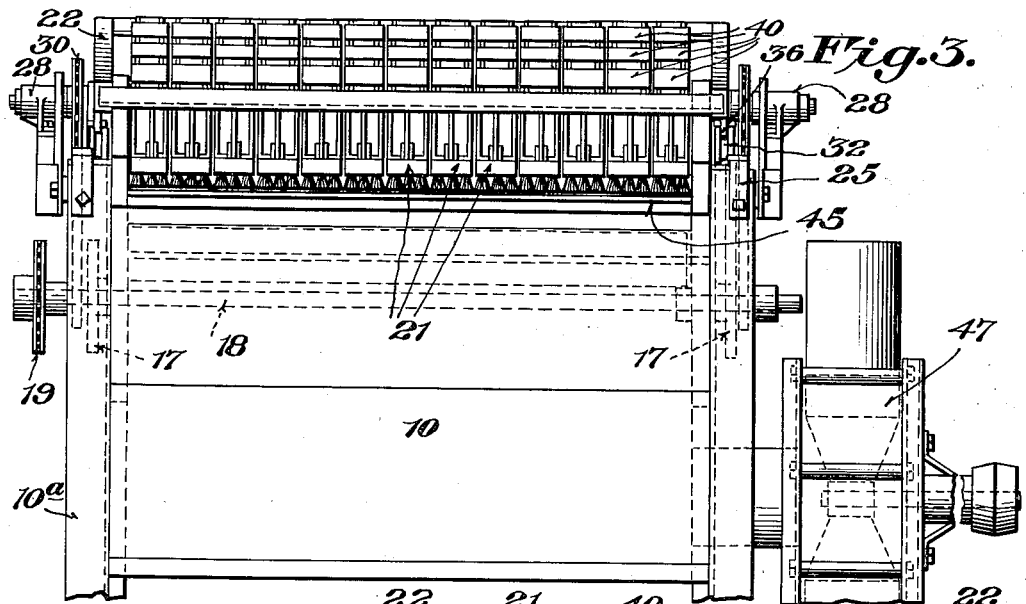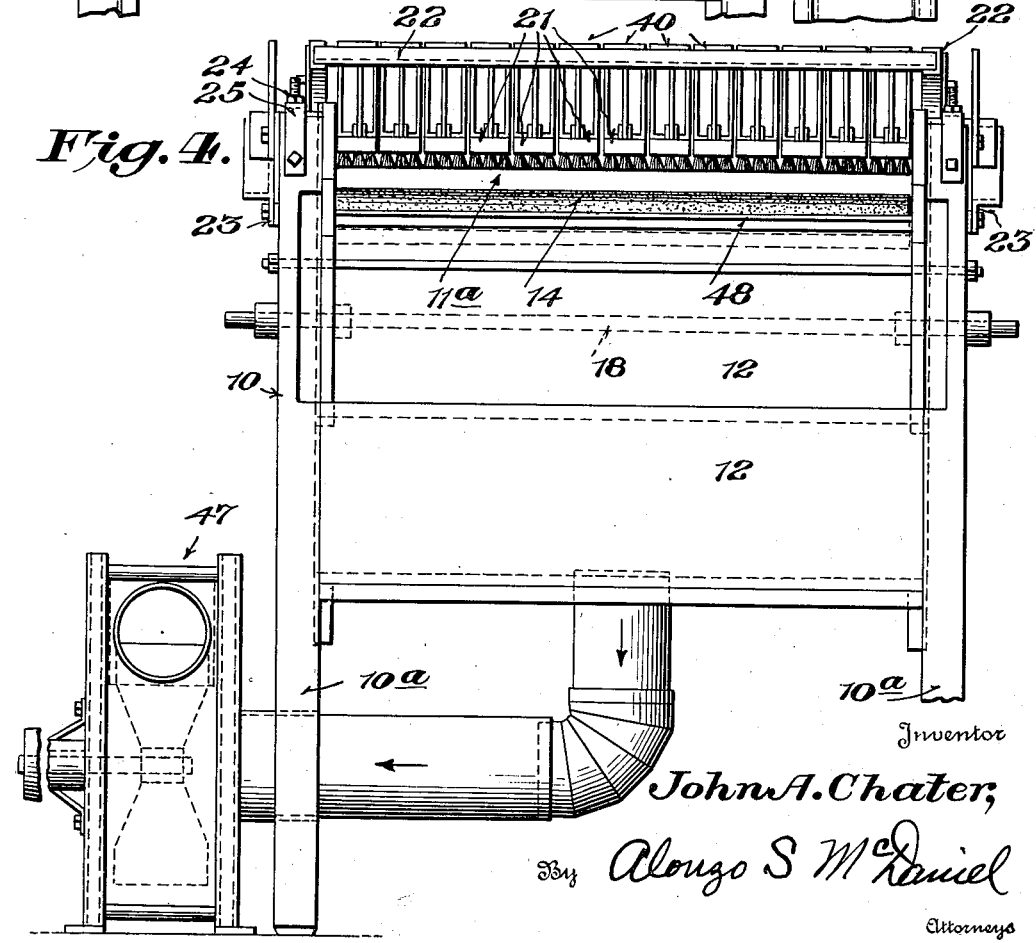

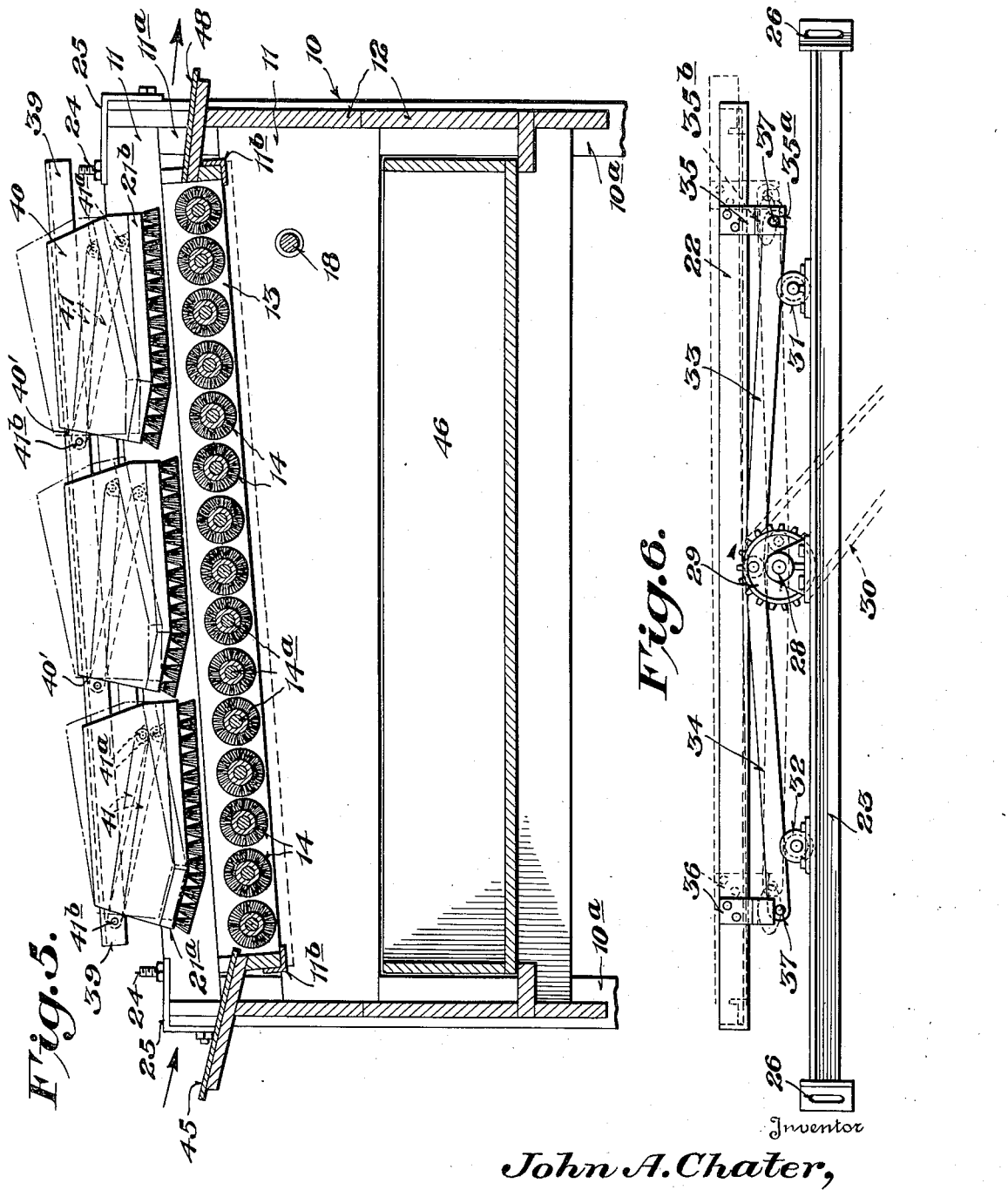

Patented Feb. 17, 1942

2,273,020

UNITED STATES PATENT OFFICE 2,273,020

FRUIT BRUSHING MACHINE

John A. Chater, Medina, N. Y., assignor to Niagara Sprayer and Chemical Co., Inc., Middleport, N. Y., a corporation Application September 17, 1938, Serial No. 230,513

16 Claims. (Cl. 146—202)

The present invention relates to a brushing machine for rollable objects and particularly is designed for the brushing of fruit, such as apples, pears, peaches, and the like, although it will be obvious that the machine may be used for other brushing purposes.

Brushing machines heretofore used for brushing fruits and vegetables, and of which the applicant has knowledge, have comprised longitudinal or transverse revolving brushes along which or over which the fruit or articles to be treated have been passed. In some instances, where transverse brushes are used as a bed, there has been disposed various types of over-hanging brushes and/or clean-out means, some on an endless chain and others being flat brushes mounted in one manner or another to have no travel movement.

The present invention aims to improve the construction and brush action over prior machines which have been employing overlying brushes, aforesaid; and also to provide in such a machine, while having brushes mounted above a lower bed of revolving brushes, will nevertheless progress the fruit through the machine in order that each piece of fruit or article being treated is moved through the machine independently of all other fruit so that no fruit will be left in the machine at the end of a run, thus eliminating any damage to the fruit or to the brushes and making it unnecessary to raise or remove any portion of the top brushes to determine whether or not fruit has remained in the machine or to clean out the fruit by hand or by special mechanical means.

In obtaining the above objects, important features of the invention reside in the provision of a series or bank of substantially flat top brushes, each brush being mounted to move in a vertical plane independently of all other of said brushes and to gyrate said brushes back and forth in a manner to elevate the battery of brushes when moved toward the on-coming fruit and to lower the brushes when moved in the direction of the progress of the fruit through the machine.

A further important feature of the invention resides in each brush of said bank of top brushes being so mounted as to be freely and bodily movable in a vertical plane equally at both ends by the fruit passing thereunder or to raise one end higher than the other end, the movement of one brush in no way affecting the position or movement of adjacent brushes. Thus, if a large piece of fruit, or other object being treated, has raised one brush, an adjacent brush will not be raised off of a smaller piece of fruit, or if one end of a brush has been raised by a large piece of fruit, its other end will not be raised off of a smaller piece of fruit and conversely.

A further feature of the invention resides in a novel construction for mounting the bank of top brushes and which permits removal and replacement of each row of brushes as an individual unit and the removal and replacement of individual brushes of its row.

Another feature of the invention is the novel means and construction by which the bed of revalving brushes may be assembled and removed from the machine as a unit.

With the above and other objects in view, the invention also resides in the sundry details of construction, combination and arrangement of parts hereinafter more fully described and pointed out in the appended claims.

In the drawings, which show the preferred embodiment of the invention as at present devised, Fig. 1 is a side view of the brushing machine of the present invention;

Fig. 2 is a top plan view of Fig. 1;

Fig. 2A is a fragmentary perspective view of the top brush supporting frame to illustrate details of construction;

Fig. 3 is a view looking at the machine shown in Fig. 1 from the intake end of the machine or from the left hand end of the machine as illustrated in Fig. 1; a modified type of exhaust fan being shown in Fig. 3 from that shown in Fig. 1;

Fig. 4 is an end view of the machine looking from the right hand side of Fig. 1 or from the discharge end of the machine;

Fig. 5 is a longitudinal sectional view taken substantially on line 5—5 of Fig. 2;

Fig. 6 is a side elevation of the top brush supporting frame and illustrating the manner in which the same is supported on and actuated on the machine.

Fig. 7 is a side elevation of several of the top brushes to illustrate the positions they may assume in operation while fruit or other objects are passing thereunder; and Fig. 8 is a perspective view showing an individual top brush and the manner in which the same is supported in the top brush frame.

Throughout the specification and drawings, like characters of reference will denote similar like parts.

Generally stated, the brushing machine of the present invention comprises a plurality of substantially parallel cylindrical revolving brushes 14 arranged side by side and sufficiently close to form a bed or conveying surface for supporting the articles to be treated which pass thereover from the intake end 45 of the machine to the discharge end 48 thereof. This bed of cylindrical revolving rollers 14 is slightly more elevated from the horizontal at its discharging end 48 than at the receiving end 45 of the machine (Figs. 1, 3, 4 and 5). Above the bed of cylindrical brushes 14, a plurality of substantially flat top brushes 21 are mounted with their lower surfaces approximately parallel to the lower bed of cylindrical revolving brushes. These top brushes 21 are all free to move independently of a vertical plane, but not transversely or longitudinally of the machine, although this bank of top brushes does have, as a unit, a gyratory movement in a vertical plane longitudinally of the machine. This gyratory movement of the top brushes 21 is such as to alternately move the entire bank of top brushes against and then with the travel of the fruit through the machine, but, while the top brushes are moving against the travel of the machine they are elevated more than they are while they are moving in the direction of fruit travelling through the machine.

Referring in detail to the drawings, the brushing machine comprises a main frame 10 having four corner posts 10a connected by side pieces 11 and end pieces 12. The side pieces 11 are slotted or otherwise deformed to provide a drawer space 11a into which a rectangular frame 13 is removably positioned and supported by suitable means 11b within the confines of the frame 10. The drawer space 11a is inclined upwardly from the intake end 45 of the machine to the discharge end 48 thereof, as particularly shown in Figs. 1 and 5, thus correspondingly inclining the frame 13.

The frame 13 supports a plurality of rotatable cylindrical substantially parallel brushes 14 arranged side by side therein and extending transversely of the machine, the spacing between the brushes being such as will maintain them out of contact, but provide a brushing bed or conveying surface for the fruit placed therein and having the inclination of the frame 13. The length of the brushes 14 may vary, of course, according to the width of the machine with which they are used but, in any case, extend from one side 11 of the frame 13 to the other.

The shafts 14a of the cylindrical brushes 14 are journalled at their ends for rotation in the side members of the frame 13. At least one end of each shaft 14a has a sprocket 15 thereon and disposed on the outer sides of the frame 13. The sprockets 15 have a sprocket chain 16 passing thereover and over a sprocket wheel 17 fast on the drive shaft 18 journalled in the frame 10 of the machine and driven from any source of power, as at 19. After the removal of the sprocket chain 16 and the bolts 20, the frame 13 carrying the brushes 14 may be moved as a unit from the side of a machine. It is understood, of course, that the upper surface of the brushes 14 rotate in the direction of travel of the fruit through the machine.

The top brushes 21 are carried by a frame 22 disposed above the cylindrical rotating brushes 14. The frame 22 comprises, preferably, a rectangular frame of side and end bars and is supported for reciprocating or gyrating movement by rails 23, one disposed on each side of the machine at the top portion of the frame 10, the rails 23 being inclined corresponding to the inclination of the frame 13. The rails 23 are supported by an adjustable hanger 24, in the form of screw rods, connecting the ends of the rails with a bracket 25, preferably secured to each corner of the machine, the rails having their ends vertically slotted, as at 26, through which extends a guide pin 27 projecting from the posts 10a.

Intermediate the length of each rail 23 is disposed a bearing 28, in which is rotatably mounted a sprocket wheel 29 driven by a chain 30 from the shaft 18. Mounted on each of the rails 23 and on opposite sides of the bearing 28 (preferably at equal distances therefrom) are grooved rollers 31 and 32, respectively, journalled on substantially horizontal axes and resting edgewise on the rollers 31 and 32 and in the grooves thereof are flat rods 33 and 34, respectively, the inner ends of these rods being connected eccentrically with the sprocket 29, or by some other equivalent means for reciprocating their rods by movement imparted by rotation of the sprocket 29.

The top brush frame 22 rests upon the outer ends of the rods 33 and 34 by means of downwardly extending lugs 35 and 36, secured to each side of the frame 22, adjacent its end portions, respectively, and having their lower ends contacting said rods 33 and 34. The lugs 35 and 36 are grooved longitudinally, as at 35a, Figs. 2A and 6, to straddle the rods 33 and 34 and to enable their bifurcated extremities to rest upon pins 37 extending through the outer ends of said rods, the lug 35 having its bifurcated portion further notched transversely, as at 35b, so as to fit or drop over its pin 37 to provide a positive connection between the frame 22 and the rods 33 to impart a to and fro movement to the frame 22, whereas the lug 36 is not so transversely notched but rides directly on its pin 37 to permit such sliding movement therebetween as may be required.

It will be noted that since the rods 33 and 34 rest in the grooves of the rollers 31 and 32, they are prevented from moving transversely of the machine but are permitted to move longitudinally of the machine; and, likewise, the longitudinal slots or bifurcations in the ends of the lugs 35 and 36 prevent the top frame 22 from moving transversely of the machine. Thus, it will be observed that, as the sprocket 29 is rotated, the rods 33 and 34 will be reciprocated back and forth longitudinally of the machine and corresponding movement will be imparted to the frame 22 by means of the pin 37 in notch 35b of lug 35. It will be further observed, however, that as the rods 33 and 34 are reciprocating their outer ends carrying the pins 37 will gyrate in a substantially elliptical path (see Fig. 6) and that the outer ends of the rods 33 and 34 are raised and lowered in their gyratory motion. The arrangement of the parts is such that, when the top brushes 21 are reciprocating toward the on-coming fruit being delivered into the machine, the brush frame 22 is raised and, as it moves with the progress of the fruit through the machine, the brush frame lowers, this action being due to the rocking of the rods 33 and 34 on the rollers 31 and 32, respectively. As the brushes rise, they release some of the pressure of the top brushes on the fruit so that the brushes may move over the fruit but, as the top frame falls, there is a greater tendency for the top brushes to bear down on the fruit and to carry it forward in the direction of progression.

In order to provide for a thorough brushing of articles or fruit of different sizes and without injury thereto, top brushes 21 are so mounted in the frame 22 as to have a free bodily movement in a vertical plane extending longitudinally of the machine, this movement being incident to the passage of articles being treated between the top flat brushes 21 and the bottom bed of rotating cylindrical brushes 14. In the present instance, the above is accomplished by providing on the end members of the top brush frame 22 a series of metal spacing pieces 38, preferably riveted to the frame ends and lying within the frame and projecting upwardly. These spacers 38 are equally distant apart and spaced only sufficiently so as to enable the brushes 21 to lie in close relation transversely of the machine, thus preventing sidewise movement of the brushes in the machine. The spacing pieces 38 may be formed on a single strip or strap secured to the frame 22, if desired.

The brushes 21 are carried by a plurality of bars 39, preferably extending longitudinally of the machine and are arranged side by side in substantially parallel relation on the frame 22, there being a number of brushes 21 on each bar 39 and arranged end to end.

The brush supporting bars 39 are preferably, channel shaped with their flanges pointing downwardly and their ends fitting over the lugs or spacing pieces 38, and their extremities abutting the end members of the frame 22, thus removably locating the bars in position on said frame 22.

Each of the top brushes 21 comprises a tubular holder 40 (see Fig. 8), preferably, rectangular in cross-section to provide a flat top surface to rest squarely on its brush supporting bar 39, a flat bottom side carrying the brush bristles and flat side walls so that the brushes can be placed closely together side by side in the machine. The end edge 40' of the holder may be champered or inclined upwardly, as shown in Fig. 7, so as to give clearance for the movement of brushes 21, when they are tilted in the manner shown, enabling them to be placed closely together end to end. The bristles of the brushes 21 may be attached directly to the bottom of the holder 40 or may be carried in a suitable backing 21b which is suitably secured to the bottom of the holder, such as by wood screws. The forward end portion of the bottom of the holder is sloped upwardly toward its forward end, as shown particularly at 40a, thus giving to the forward portion 21a of the brush an inclined position relative to the major portion of the brush 21 and to the supporting brush bar 39. This upward inclination of the brush 21a is sufficient to enable the fruit, or other articles being treated, to enter under the same without damage. Consequently, as fruit progresses through the machine, it first comes in contact with the sloping brush portion 21a, causing the brush and its holder 40, acting as a unit, to raise to the tilted position as shown at a in Figure 7 and, as the fruit progresses through the machine and contacts the main body of the brush 14, the brush will be raised to the position shown at b in Figure 7 and, as the fruit passes from under the brush in its travel, the brush will assume the position shown at c in Figure 7; provided, of course, that no other fruit has entered under the inclined portion 21a of the brush, in which case both ends of the brush will be elevated to a degree according to the size of the fruit thereunder. Thus positions of the brush shown in Figure 7, of course, indicate the limit of their upward movement in various positions and this limit, of course, will only be attained with extraordinarily large articles.

When the supporting brush bars 39 are mounted in the frame 22 on the positioning pieces 38, the inner flat sides of each brush holder 40 lies in close substantially parallel relation with the adjacent sides of its supporting bar 39, thus providing cooperating guide elements permitting vertical movement of said holder but preventing any appreciable side swing or movement of adjacent brushes on either side, but obviously other cooperating guide means may be employed to accomplish this purpose. Also swinging or lateral movement of the brush holders 40 may be insured by their adjacent outer flat sides being quite close together, as shown, to contact and said sides of the outer rows being restrained by the flat side members 11 of the machine frame 10 which also provides said cooperating guide elements. The total width of all the brush holders across the machine is only a trifle less than the width of the inside dimensions from side board 11 to side board 11 of the machine. Thus all the top brush holders are prevented from swinging sideways, but are free to move up and down vertically or to take any angle in a vertical plane within the limits allowed by the tubular holder 40.

In order to prevent longitudinal movement of the brush holders 40 and at the same time allow for said free bodily movement in a vertical plane as above described and illustrated, a link 41 is provided for each brush holder and is pivotally connected at one end to an end portion of the holder adjacent the bottom thereof, as at 41a, while the other end of the link extends diagonally upwardly and, preferably, beyond the holder where it is connected to the brush supporting bar 39, as at 41b. The link 41 of each holder 40 preferably extends from the bars 39 rearwardly of the machine toward its discharge end 48 and is disposed under the bars 39 and extended into the holder 40. Furthermore, the links 41 may be of a width substantially that of the holders 40, sufficient clearance being allowed for free vertical movement of the holder, but to prevent lateral movement thereof.

Manifestly, each top brush 21 will contact throughout its length all fruit or articles which pass thereunder, irrespective of whether there is two fruit of different size thereunder, and the vertical movement imparted to one brush 21 by the fruit thereunder does not affect, change, influence or alternate the position or movement of an adjacent brush 21.

The vertical movement of the top brushes just described takes place, when fruit is passing through the machine, simultaneously with the reciprocating or gyrating movement of the brush supporting frame 22 and functions to assist in progressing the fruit through the machine in a positive manner and independently of any contact with following or on-coming fruit being fed into or through the machine.

From the above it will be seen that each longitudinal row of top brushes 21 is freely removable from and replaceable in the frame 22 by simply lifting its supporting bar 39 even though the machine is in operation. If one brush needs to be replaced, it can be replaced from a row without discarding the entire row of brushes.

It will be observed from the above that, if it is desired to adjust the top brushes 21 vertically with respect to the bed of revolving brushes 14, proper manipulation of the screws 24 will adjust the entire system of top brushes for any desired distance above the revolving brushes 14, thus accommodating the machine to different size or run of fruit to be treated.

Fruit is received at the forward end of the machine on a chute or other equivalent means 45 and rolls down to the bed of revolving rollers 14, from whence it is carried under the upwardly inclined forward end 21a of the first top brushes and, due to the reciprocating and gyrating action of the top brush frame 22 above described and the rotation of the brushes 14, is positive progressively fed through the machine, the fruit being thoroughly brushed and turned from side to side as it moves from valley to valley between the rotating brushes 14, thus eliminating the necessity for any type of special clean-out means, either of a manual or mechanical nature. The top brushes 21 raise and lower in a vertical plane as the fruit passes thereunder and due to the manner in which they are mounted, each brush may tilt longitudinally of the machine to contact fruit of any size travelling thereunder so as to thoroughly clean the same.

In the treating of fruit or other articles from which there is a dust, fuzz, or other residue, such may be collected in a bottom pan 46 underlying the rotary brushes 14. In such instances as may be desirable, the bottom pan 46 may be connected with an exhaust fan 47 (of any approved type) for removing such dust or residue from the machine. Due to the close disposition and arrangement of the top brushes 21 and of the side members 11, the machine is sufficiently enclosed to enable the suction fan to be effective for not only removing the dust from the pan 46 but for cleaning the brushes.

Having thus described the invention and the manner in which the same is to be performed, it is to be understood that the invention is not limited to the exact construction herein shown and described as many modifications and variations may be made therein, which fall within the scope of the appended claims.

What is claimed is:

1. In a fruit treating machine, a main frame, a substantially flat bed carried by said main frame over which the fruit passes, a frame disposed over the bed and substantially parallel therewith, an eccentric journalled on each side of the machine, a pair of rods on each side of the machine and having at one of their ends operative connection with said eccentric, the other ends of each pair of rods extending toward opposite ends of the machine, the outer ends of one rod of each pair having a journal connection with said overlying frame, means for slidably supporting said overlying frame on and near the outer ends of the other rods of each pair at the opposite end of said overlying frame, means for slidably supporting said rods on the main frame at points a predetermined distance from their points of engagement with said overlying frame, and means for rotating said eccentrics in synchronism and fruit contacting elements carried by said overlying frame.

2. In a fruit treating machine, a main frame, a substantially flat bed on said main frame over which the fruit passes, an overlying frame adjacent and substantially parallel to said bed, eccentrics on each side of the machine, rods having an operative connection with said eccentrics at a predetermined point in their length, supports on the main frame for said rods on which the rods have a longitudinal sliding and vertical rocking movement when operated by said eccentrics, means for actuating said eccentrics, said overlying frame being supported on said rods whereby the motion of said rods is imparted to the overlying frame, and fruit contacting elements carried by said overlying frame.

3. In a brushing machine, means for supporting fruit travelling longitudinally through the machine, a frame carried by the machine above said supporting means, a plurality of elongated tubular brush holders arranged above the supporting means with their tubular portions extending longitudinally of the machine, one or more bars carried by said frame and extending longitudinally of the machine and through said tubular brush holders, substantially flat brushes carried on the lower sides of said brush holders, and means to prevent longitudinal motion of said brush holders on said bars while permitting changes of position in a vertical plane.

4. In a brushing machine, means for supporting fruit travelling longitudinally through the machine, a frame carried by the machine above said supporting means, a plurality of elongated tubular brush holders arranged above the supporting means with their tubular portions extending longitudinally of the machine, one or more bars carried by said frame and extending longitudinally of the machine and through said tubular brush holders, substantially flat brushes carried on the lower sides of said brush holders, and means to prevent longitudinal motion of said brush holders on said bars while permitting changes of position in a vertical plane, the forward end of said brushes, with respect to the travel of the fruit, being vertically inclined.

5. In a brushing machine, a main frame; brushing means carried by said frame for supporting fruit progressing longitudinally through the machine, a plurality of elongated tubular brush holders overlying said brushing means and of substantially rectangular cross-section and arranged side-by-side and end-to-end, a plurality of bars carried above and longitudinally of said brushing means and each extending through a row of said tubular brush holders, the spacing of said bars being such that the flat sides of brush holders on adjacent bars may rub together to prevent side motion of their neighbors while allowing changes of position in a vertical plane, flat vertical sides of the main frame for contacting the sides of brush holders on the outside rows thus preventing substantial lateral movement of all the brush holders, brushes on the lower faces of said brush holders, and means for preventing longitudinal movement of said brush holders relative to said bars while permitting changes of position in a vertical plane.

6. In a fruit polishing machine which includes a bed for supporting fruit progressing through the machine, a plurality of fruit brushes disposed above said bed and arranged side-by-side and end-to-end to cover the polishing area of said bed, a tubular supporting member on each brush and having substantially flat vertical sides, means extending through said tubular member for supporting said brushes at a predetermined level with the flat vertical sides of said tubular members in juxta-relation, while permitting their vertical displacement above said level, means for preventing movement of said brushes in the direction of progress of the fruit through the machine while permitting said vertical displacement, and means cooperating with the outside vertical lateral surfaces of those members on each side of the machine to prevent substantial lateral movement thereof whereby the lateral movement of all said brushes is restrained by the mutual cooperation of their flat vertical sides while free vertical displacement is permitted.

7. In a polishing machine, a bed for supporting fruit progressing through the machine, a bar supported above said bed and arranged longitudinally of the path of travel of the fruit, a plurality of disconnected flat brushes arranged along the length of the bar at a predetermined level parallel above said bed and each having flat vertical sides extending to and resting upon said bar whereby each brush may have an independent movement of each other in a vertical plane when articles being treated pass under and contact said brushes, and a link connection between each brush and said bar for preventing longitudinal movement of said brush with respect to said member.

8. In a fruit polishing machine, a bed over which the fruit passes, a supporting bar overlying said bed and extending longitudinal of the path of travel of the fruit, an elongated tubular member through which said bar loosely extends and from which it is suspended, the lower side of said tubular member carrying a flat brush, means for preventing longitudinal movement of the tubular member along said bar, said loose connection between the bar and the tubular member permitting the brush to have a bodily displacement and tiltable movements in a vertical plane at both ends of the brush, when articles being treated pass under and in contact with the brush.

9. In a fruit cleaning machine, a flat fruit carrying bed on the main frame, a side member on each side of said main frame, means for attaching said side members to said main frame with provision for vertical adjustment; a rectangular frame adjacent and substantially parallel to said bed, eccentrics on each side of the machine journalled in bearings on said side members, rods on opposite sides of the machine and connected at a predetermined point in their length with said eccentrics, supports on said side members for said rods permitting longitudinal sliding and vertical rocking movement of said rods, pivotal connections between said rods and one end portion of said rectangular frame, slidable and rocking connections between said rods and the other end portion of said rectangular frame, means for rotating both eccentrics in synchronism, and fruit contacting elements carried by said rectangular frame.

10. In a fruit polishing machine, a bed, a plurality of spaced channel shaped bars with their channeled sides down and arranged longitudinally of and above said bed, lugs supported at each end of the machine for engagement with the channeled sides of said bars to position said bars while permitting their free upward removal from the machine, a plurality of fruit contacting elements supported by said bars at a predetermined level.

11. In a fruit polishing machine, a bed, a plurality of spaced channel bars with their channeled sides downward and arranged longitudinally of and above said bed, lugs at each end of the machine for engaging in the channeled sides of said bars to position them while permitting their free upward removal, a plurality of tubular elements having said bars extending therethrough and thereby supporting the same, fruit contacting elements on the lower sides of said tubular elements, and individual means cooperating with said channel bars and each tubular element on each bar for restraining longitudinal movement of each tubular element along the bar supporting it while permitting vertical movement of the tubular elements by virtue of a loose fit of the bars in the tubular elements.

12. In a fruit polishing machine, a relatively horizontal fruit carrying means, a rectangular frame positioned above said carrying means, a plurality of upwardly projecting lugs at each end of said rectangular frame, a plurality of channel bars with their channeled sides fitting over said lugs thus allowing free upward removal of said bars, a plurality of tubular elements having each of said bars extending therethrough and thus supporting the same, fruit contacting elements on the lower sides of said tubular elements, individual means cooperating with said channel bars and each tubular element on each channel bar for restraining longitudinal movement along the bar supporting it while permitting vertical movement of the tubular elements by virtue of a loose fit of the bars in the tubular elements, and means for gyrating said frame in a vertical path extending longitudinally of the travel of the fruit through the machine to raise and move the brushes opposite to the direction of travel of the fruit and then lower and move the brushes with the travel of the fruit.

13. In a polishing machine for rollable objects, a main frame, a plurality of adjacent transverse parallel cylindrical brushes mounted in the main frame with their axes substantially in the same plane to provide a bed; a second frame above the cylindrical brushes, means for supporting and gyrating said second frame in a plane substantially at right-angles to the axes of the cylindrical brushes, whereby the frame is automatically lowered and moved with respect to the path of travel of the objects over said cylindrical brushes and then raised and moved in an opposite direction to said path of travel where it is again lowered; a plurality of substantially flat brushes carried by said second frame to overlie said bed in a longitudinal series; and means mounting each of said flat brushes on said second frame to have a movement independent of the other brushes and relative of said second frame, said last mentioned mounting means including cooperatively related guide elements limiting said independent movement of each flat brush to a substantially vertical movement in the plane of its series of brushes.

14. In a polishing machine, a bed for supporting fruit and the like progressing through the machine; a bar supported above said bed and arranged longitudinally of the path of travel of said fruit; one or more flat fruit contacting brushes arranged along said bar; means mounted on said bar suspending each brush at a predetermined level with respect to said bed and allowing vertical movement independent of the other brushes, said means including cooperating rigid guide elements preventing swinging movement of the brushes at substantially right angles to the direction of travel of the fruit through the machine; and a pivoted link means between said bar and each brush for preventing longitudinal movement of said brush on the bar while allowing endwise tilting movement at either end of the brush longitudinally of the travel of the fruit when passed over the bed in contact with said brush.

15. In a fruit polishing machine, a bed for supporting and carrying fruit; a bar arranged in a substantially horizontal plane and supported above and longitudinally of said bed; a plurality of disconnected flat elongated and substantially rigid back fruit contacting brushes arranged under and lengthwise along said bar; rigid hanger means connecting the bar and the brush for supporting each brush from said bar at a predetermined level with respect to the bed, each of said flat brushes being formed with a portion of its lower surface normally parallel to said bed and the end of said surface first contacted by the fruit being inclined upwardly; means cooperating with said hanger means preventing substantially longitudinal movement of each of said flat brushes relative to each other and to said bar while allowing vertical displacement of each brush and endwise tilting of the brush relative to the bed in the direction of said bar independently of the adjacent brushes, and means cooperating with said last mentioned means preventing lateral swinging movement of said brushes.

16. In a polishing machine, a plurality of adjacent transverse parallel cylindrical rotatable brushes forming a brushing bed over which fruit and the like passes through the machine; a frame carried by the machine above said bed; substantially flat elongated brushes extending longitudinally of said bed in a plurality of substantially parallel series longitudinally of said bed; supporting means mounting each of said flat brushes on said frame to have their major brushing surfaces normally lie in substantially the same plane substantially parallel to the bed and to have a movement independent of the other brushes and including cooperating related guiding elements limiting said movement of said flat brushes to substantially vertical movements, said elements allowing each individual brush to have a tilting movement at either end in the vertical plane of its series of brushes.

JOHN A. CHATER.